(12) United States Patent
Nchari et al.

(10) Patent No.: US 12,121,044 B2
(45) Date of Patent: Oct. 22, 2024

(54) BEVERAGE POWDER AND METHOD

(71) Applicant: Koninklijke Douwe Egberts B.V., Utrecht (NL)

(72) Inventors: Luanga Nchari, Hurley (GB); Ayse Tulay Massey, Hurley (GB); James Close, Hurley (GB); Mehdi Almant, Hurley (GB); Sarah West, Hurley (GB); Zhen Kai Ong, Hurley (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 1109 days.

(21) Appl. No.: 16/965,953

(22) PCT Filed: Feb. 6, 2019

(86) PCT No.: PCT/EP2019/052894
§ 371 (c)(1),
(2) Date: Jul. 29, 2020

(87) PCT Pub. No.: WO2019/154848
PCT Pub. Date: Aug. 15, 2019

(65) Prior Publication Data
US 2021/0068427 A1    Mar. 11, 2021

(30) Foreign Application Priority Data

Feb. 9, 2018 (GB) .................................. 1802161

(51) Int. Cl.
| | | |
|---|---|---|
| *A23P 10/22* | (2016.01) | |
| *A23L 2/395* | (2006.01) | |
| *A23P 10/20* | (2016.01) | |
| *A23P 10/40* | (2016.01) | |
| *A23P 20/18* | (2016.01) | |
| *A23P 10/47* | (2016.01) | |
| *A23P 20/15* | (2016.01) | |

(52) U.S. Cl.
CPC ............... *A23L 2/395* (2013.01); *A23P 10/20* (2016.08); *A23P 10/22* (2016.08); *A23P 10/40* (2016.08); *A23P 20/18* (2016.08); *A23P 10/47* (2016.08); *A23P 20/15* (2016.08)

(58) Field of Classification Search
CPC .. A47J 31/407; A47J 31/3676; A47J 31/3623; B65D 85/8043; B65D 85/8046; A23P 10/20; A23P 10/22; A23P 10/30; A23P 10/47; A23P 20/15; A23P 20/18; A23L 2/395
USPC ............................................. 99/295; 426/115
See application file for complete search history.

(56) References Cited

U.S. PATENT DOCUMENTS

| | | | | |
|---|---|---|---|---|
| 6,758,130 | B2 * | 7/2004 | Sargent .............. | B65D 85/8061 426/115 |
| 2002/0037353 | A1 * | 3/2002 | Villagran ............... | A23L 27/72 426/590 |
| 2010/0239733 | A1 * | 9/2010 | Yoakim .............. | B65D 85/8061 99/302 R |
| 2012/0231133 | A1 * | 9/2012 | Kamerbeek .......... | B65D 65/466 426/77 |
| 2013/0337123 | A1 * | 12/2013 | Fisk ........................ | A23F 5/405 426/433 |
| 2017/0210554 | A1 * | 7/2017 | Black ....................... | A23P 10/40 |
| 2019/0110507 | A1 * | 4/2019 | Jacon ......................... | A23L 2/52 |

FOREIGN PATENT DOCUMENTS

| | | |
|---|---|---|
| CN | 1282544 | 2/2001 |
| DE | 102004024680 A1 | 12/2005 |
| EP | 0045894 A2 | 2/1982 |
| EP | 1074188 | 2/2001 |
| RU | 2331348 | 8/2008 |
| WO | 0133971 A1 | 5/2001 |
| WO | 02074143 A2 | 9/2002 |
| WO | 2004064585 | 8/2004 |
| WO | 2009103592 | 8/2009 |
| WO | 2011039027 | 4/2011 |
| WO | 2011063322 | 5/2011 |
| WO | 2016014497 A1 | 1/2016 |
| WO | 2016014503 | 1/2016 |

OTHER PUBLICATIONS

International Search Report and Written Opinion mailed May 13, 2019; Internationl Application No. PCT/EP2019/052894 (12 pgs.).
Search Report; date of search Aug. 9, 2018; Application No. GB1802161.8 (4 pgs.).

* cited by examiner

*Primary Examiner* — Reginald Alexander
(74) *Attorney, Agent, or Firm* — Fitch, Even, Tabin & Flannery LLP (57) ABSTRACT

This invention provides for an agglomerated beverage ingredient powder comprising a median particle size (D50) of between 200 and 1000 microns and a density of between 250 and 950 g/l.

10 Claims, 3 Drawing Sheets

BEVERAGE POWDER AND METHOD

CROSS REFERENCE TO RELATED APPLICATIONS

This application is a U.S. national phase application of International Application No. PCT/EP2019/052894, filed Feb. 6, 2019, which claims benefit from Great Britain Application 1802161.8, filed Feb. 2, 2018, which are each hereby incorporated herein by reference in their entirety.

TECHNICAL FIELD OF THE INVENTION

The present invention relates to beverage ingredient powders for use in a beverage preparation machines, particularly agglomerated beverage powders. The invention further relates to processes for making beverage ingredient powders and containers, methods of making beverages and to beverage ingredient containers containing beverage ingredients per se.

BACKGROUND TO THE INVENTION

When preparing a beverage from a powdered ingredient, it is known in the art, that powder solubility can be a problem, resulting in a drink with grainy texture or weak concentration and an undesirable leftover residue of wetted powder. Many options exist to the skilled person when faced with a problem of powder solubility, including, varying the type or blend of solvent, increasing the temperature or volume of the solvent, the introduction of shear or increasing powder-solvent contact time for example. Some of these options are of limited use in certain circumstances; for example, in applications that comprise milk powder, the effect of increasing temperature can reduce solubility. It is also known that the physical properties of the powder can have a dramatic effect on its solubility. Powders with the same chemical structure but different physical properties, such as density, particle size, particle size distribution or porosity, for example can have vastly different solubility. In some applications, such as containers for use in beverage preparation machines, it is known that various of these levers for adjusting solubility are restricted/limited or unavailable.

Many beverage preparation systems are known in the art. These systems usually comprise a beverage preparation machine and a beverage ingredient container, for use in conjunction with the beverage preparation machine. Beverage ingredient containers can be in the form of sachets, soft pads, semi-rigid pads, rigid pads, capsules, discs and pods of plastics or aluminium and can contain extractable and/or soluble beverage ingredients. Beverage preparation machines usually contain a water source, heat source and pump with which to deliver heated water through the beverage ingredient container and into a cup.

Typically, beverage ingredient containers are inserted into beverage preparation machines by a consumer when a beverage is made.

A typical beverage preparation machine is configured in use to deliver a predetermined volume and/or flow rate of water to the beverage ingredient container in order to dissolve, suspend and/or extract some or all of the beverage ingredient contained therein and then to dispense a beverage of a desirable volume and solids content. Typically, the amount of water delivered to the beverage ingredient container is determined by a timed activation of a water pump or by a set threshold on a flow meter, in either case the volume of water passed through the beverage ingredient container is limited.

In known systems, in the case where a beverage ingredient contained within the beverage ingredient container is soluble, there is often a residual amount of beverage ingredient left within the beverage ingredient container once the desired volume of water has been dispensed by the beverage preparation machine. This often results in a beverage with less than the desired amount of dissolved beverage ingredient and/or wasted beverage ingredient left within the beverage ingredient container once a beverage has been prepared. A known method of overcoming this problem is to add an excess of beverage ingredient to the beverage ingredient container to ensure that, even with a residue, sufficient beverage ingredient is dissolved by the desired volume of water and sufficient beverage ingredient is present in the prepared beverage. This improves the solids content of the beverage but increases the amount of wasted beverage ingredient left within the beverage ingredient container and causes significant difficulties in fitting the excess beverage ingredient into containers of the defined size used for each system. Furthermore, this effect has an upper practical limit. Above a threshold, the addition of more beverage ingredient powder has no effect on the solids content of the beverage that is produced.

Further, it is known that, if beverage ingredient containers are stored incorrectly or for many months before use, the amount of residue can increase for a given beverage ingredient container, after the beverage ingredient has been extracted, dissolved or suspended.

It would be advantageous to provide an agglomerated beverage ingredient and/or agglomeration process for the manufacture of an agglomerated beverage ingredient that can withstand manufacturing processes required to fill beverage ingredient containers without significant breakage or disintegration into significant quantities of fine particles ("fines").

It is also known in the art to manipulate the physical properties of beverage ingredients in order to affect their solubility, however, known solutions to improve solubility all have some other property that is detrimental to the desirable properties in a beverage preparation system. For example, known agglomeration techniques increase solubility of beverage powders and therefore may have an impact on reducing residues within beverage ingredient containers; however, the same known agglomerated beverage ingredient powders have reduced density and therefore sufficient mass of beverage ingredient cannot easily be added to the relatively small volume of a beverage ingredient container in order to create a beverage of desirable volume and solids content. Further, such known agglomerated powders, can also be incompatible with the processes involved in the manufacture of beverage ingredient containers such that their increased friability results in breakage of agglomerated powders during manufacture and handling; thereby increasing fine particles, and thus, reducing solubility; in turn creating more dust and hindering container sealing.

High levels of fines (>15%) and low porosity can also create significant dust in filling lines resulting in frequent cleaning of the lines reducing efficiency Additionally, known beverage ingredient powders may lose solubility over the shelf life of a commercial product, and, thus, within reasonable storage times of months, residues may increase above acceptable levels.

It is known that such disadvantages are particularly associated with beverage ingredients that contain an amount of fat.

Known powders include those described in the following documents: WO2016/014503, WO2011/063322, WO2011/039027, WO2009/103592, WO2004/064585. Each one of these documents suffers from one or more of the disadvantages described above, such as, low porosity, high percentage fines, sub-optimal particle size, etc. Further, it is known that the properties of a fluid used to dissolve or otherwise transport beverage ingredients into a prepared beverage can impact the amount of beverage ingredient in the prepared beverage. Parameters of the fluid, such as, but not limited to, temperature, pressure, flow rate and/or aeration may be adjusted by adjusting settings and/or components in a beverage preparation machine. In particular, beverage preparation machines that operate at relatively low fluid pressures (i.e. those below about 5-10 bar) suffer from poor solubility of beverage powders than those that operate at higher pressures (i.e. those above about 10 bar)

It is an aim of embodiments of the invention to create the optimum combination of beverage ingredient properties paired with optimum fluid properties provided by a beverage preparation machine in order to maximise the amount of beverage ingredient transported by the fluid to a prepared beverage. It is a further aim of embodiments of the invention to achieve this result in beverage preparation machines that provide a range of alternate beverages with a range of beverage ingredients and/or beverage ingredient containers.

It would be advantageous to provide a beverage ingredient container containing a soluble beverage ingredient that yields less residue after use in a beverage preparation machine.

It is an aim of embodiments of the invention to increase the solubility of beverage ingredients within the confined of beverage ingredient containers.

In would also be advantageous to provide a fat-containing beverage ingredient for use in beverage containers of the type described herein, which has reduced problems relating to storage, shelf-life, residue production and insufficient solubility.

It is therefore an aim of embodiments of the invention to mitigate or reduce a disadvantage presented by the prior art.

SUMMARY OF THE INVENTION

According to a first aspect of the invention there is provided an agglomerated beverage ingredient powder comprising a median particle size of between 150 and 1000 microns and a density of between 250 and 950 g/l, for use in a beverage preparation machine.

In an agglomerated powder the median particle size refers to the size of the agglomerated clusters or aggregates per se, rather than the size of individual particles making up the agglomerated clusters or aggregates. Likewise, 'agglomerated particles' hereinafter refers to the aggregates, agglomerates or clusters formed from particles, rather than the particles themselves.

Agglomerated powders are particularly useful for the invention, providing optimum solubility, reduced fines, and which enable the bulk density size to be maintained within the range of the first aspect of the invention. Powder formed from agglomerated particles may also be called aggregates or agglomerates.

The beverage powder of the invention provides a number of beneficial characteristics and advantages, for use in beverage containers, including:

a) better powder flowability in processing lines;
b) the opportunity to create more concentrated drinks with little/no residues from a given package volume initially and overtime; and
c) increased consumer liking It is believed that the specific combination of average particle size (with minimal fines) and density, confers the optimal physical characteristics to the powder, such that it flows freely, leaves minimal residue in a beverage container after extraction with water, and yet can be used to fill a beverage container without requiring over-packing.

In some embodiments, the beverage ingredient powder has a median particle size, sometimes described as D50, of at least 175, 200, 225, 250, 275 microns and/or no more than 900, 800, 700, 600, 550, 500 or 450 microns. In preferred embodiments, the median particle size is greater than 200 or 250 microns as this creates the optimal balance of powder flowability and solubility whilst avoiding the likelihood of fines after packing.

In some preferred embodiments, the beverage ingredient powder has a median particle size of between 150 and 600 microns, between 175 and 600 microns; between 200 and 600 microns; between 200 and 550 microns; or especially, between 200 and 500 microns or 250 and 450 microns. Median particle size may be measured by laser diffraction method (e.g. Helos). Median particle size may be measured by the method used in Example 2.

At such relatively large particle sizes the benefits of increased solubility are particularly felt/perceived.

In some embodiments, the beverage ingredient powder has density of at least 250, 300, 350 g/l or 400 g/l and/or no more than 950, 850, 650 or 600 g/l and/or between 250-950 g/l, 250-850 g/l; 350-850 g/l; 250-600 g/l or 350-600 g/l. A density of at least 350 g/l is preferred because it enables sufficient packing volume within a suitable beverage container whilst avoiding or mitigating dust formation and excess powder compaction. The density of the beverage ingredient powder is preferably the bulk density, sometimes known as free-flow density. Bulk density can be measured, for example, using a volumetric cylinder, by the method laid out in Example 2. It should be noted that "bulk density" is different to vibrational/tapped density; bulk density being the density of powder that has not been compressed, agitated or otherwise allowed to settle and reduce interstitial space between agglomerated particles; while "tapped density" refers to the density of the powder which has been tapped, compressed, agitated, vibrated or otherwise manipulated to reduce the interstitial space between agglomerated particles, aggregates or agglomerates in the powder.

Embodiments with such bulk densities have the particular advantage of allowing for sufficient amount of the powder to be added to a small container without negatively affecting powder flowability, solubility or beverage characteristics.

The beverage ingredient powder may comprise a powder selected from a chocolate beverage powder, a milk powder, dairy creamer and a non-dairy creamer powder. In preferred embodiments, the beverage ingredient powder comprises fat and in more preferred embodiments it is a fat-containing powder selected from a chocolate beverage powder, a milk powder and a non-dairy creamer powder.

In embodiments in which the beverage ingredient powder comprises fat, it may comprise at least 5%, 6%, 7%, 8%, 9% or 10% wt fat and/or no more than 70%, 60%, 50%, 30%, or 20% wt fat, and/or between 5% wt and 25% wt, 70% wt fat, preferably between 10%-25% wt; 5%-20% wt or 10%-20% wt fat by weight. In embodiments, where the beverage ingredient powder is chocolate powder; it may comprise at least 4%, 4.5%, 5%, 5.5% or 6% wt fat and/or no more than 9%, 8.5%, 8%, 7.5% or 7% wt fat and/or between 4%-9% wt; 4%-8% wt; 4%-7% wt; 5%-9% wt; 5%-8% wt or 6%-8% wt fat. In further embodiments, where the beverage ingredient powder is a milk powder, it may comprise at least 10%, 11% or 12% wt and/or no more than 30%, 25%, 22% or 20% wt fat and/or between 10%-25% wt, 10%-20% wt, 12%-25% wt or 12%-20% wt fat. In further embodiments, where the beverage ingredient powder is a dairy creamer powder or a non-dairy creamer powder, it may comprise at least 25% wt and/or no more than 70% wt fat and/or between 25%-70% wt fat.

Beverage powders that contain fat in such quantities as described here are known in the art to have lower solubility in water. Embodiments of the invention that have such fat content have the particular advantage of sufficient solubility to create a beverage with adequate solids content and low beverage ingredient residues.

In a special embodiment, the beverage ingredient powder comprises a median particle size (D50) of between 150 and 1000 microns (or between 200 and 1000 microns) and a density of between 700 g/l and 950 g/l and between 5%-25% wt fat. This formulation is found to have a particular advantage of further optimised solubility. Without wishing to be bound by theory the inventors believe that this particular fat range conveys sufficient 'wettability' to the powder to undergo agglomeration processing.

In some embodiments, the beverage ingredient powder has water activity of less than 0.45, 0.40, 0.39, 0.38 or less than 0.37, which may for example be measured by standard dew point measurement method on Aqua Lab 3 TE Series, as described in Example 2, and in preferred embodiments it is of less than 0.35 or less than 0.32, and most preferred between 0.20-0.30. Preferably, throughout prolonged storage the powder maintains a water activity of less than 0.45.

Embodiments with low water activity have the additional advantage of excellent solubility after storage.

In some embodiments, the beverage ingredient powder has porosity of at least 0.1 or, preferably at least 0.2 and/or no more than 0.8 or, preferably no more than 0.7 and/or between 0.1-0.8, 0.4-0.8, 0.4-0.7 or preferably between 0.3-0.7, which may be calculated, for example by the method of Example 2 from particle density (measured by pycnometer) and bulk density. Preferably, this porosity refers to the total porosity including that of the powder and the bed of powder.

In some embodiments, the beverage ingredient powder has an amount of fine particles ("fines", particles less than 90 microns, sometimes described as Q90 of no more than 20, 18, 17, 16, 15, 14, 13, 12 or 11% of the beverage ingredient powder and/or at least 2, 3, 4 or 5%. In some embodiments the amount of fines is between 2-20%, preferably between 2-15%, more preferably between 3-15%, and most preferably between 3-12%. The fines may be measured, for example, by laser diffraction particle size measurement (e.g. Helos)—and a description of this measurement technique is included in Example 2.

Embodiments with such levels of fines have the particular advantage of improved solubility over beverage ingredient powders with alternative levels of fines.

According to a second aspect of the invention, there is provided a method of making an agglomerated beverage ingredient powder of the first aspect of the invention, comprising steps of:
A. Fluidising a bed of beverage ingredient powder with the introduction of a gas;
B. Spraying liquid droplets onto the fluidised bed of beverage ingredient powder;
C. Drying the fluidised bed of beverage ingredient powder; and
D. Cooling the fluidised bed of beverage ingredient powder;

In some embodiments, the beverage ingredient powder is selected from a chocolate powder, a milk powder, a dairy creamer powder or a non-dairy creamer powder.

In some embodiments, the gas used to fluidise the bed of beverage ingredient powder is heated and/or cooled at different stages along the process.

In some embodiments, the gas used to fluidise the bed of beverage ingredient powder is heated in steps A, B and/or C to between 50 to 70° C., preferably between 55 to 65° C. In embodiments where the gas is heated in step B, it is preferably heated to between 50 to 70° C., more preferably to between 55 to 65° C. In embodiments where the gas is heated in step C, it is preferably heated to between 60 to 80° C., more preferably to between 65 to 75° C.

In some embodiments, the gas used to fluidise the bed of beverage ingredient powder is cooled in step D to between 5 to 25° C., preferably to between 10 to 20° C.

Embodiments with such heating and/or cooling of the gas have the additional advantage of low level of fines in the agglomerated beverage powder in further processing due to strong adhesion between the particles of beverage powder and low particle breakage.

In some embodiments, the gas used to fluidise the bed of beverage ingredient powder is delivered at a flow rate of between 400 to 700 Nm$^3$/h, preferably between 500 to 600 Nm$^3$/h.

Embodiments with such gas flow rate have the additional advantage of good particle size distribution for beverage ingredient applications.

In some embodiments, the liquid droplets comprise water. In some embodiments, the pressure under which the spray of liquid droplets is formed is between 1 to 3 bar, preferably between 1.5 to 2.5 bar.

In some embodiments, the spray rate of the liquid water droplets is between 0.5 to 3.0 kg/h, preferably between 0.7 to 2.0 kg/h, most preferably between 0.8 to 1.6 kg/h.

In some embodiments, step B comprises a percentage liquid droplet volume to beverage ingredient powder volume of between 4 to 6%, more preferably between 4.5 to 5.5%. In some embodiments, the liquid droplet volume to beverage ingredient powder volume is between 1:99-1:9, preferably between 1:24-3:47 and more preferably between 4.5:95.5-5.5:94.5.

Embodiments with such pressures, spray rate and/or droplet volume to beverage ingredient powder ratio have the additional advantage of low level of fines in the agglomerated beverage ingredient powder.

In some embodiments, the beverage ingredient powder spends between 5 and 15 minutes in step B.

Embodiments with such residence time in the wetting zone have the additional advantage of lower fines.

In some embodiments the beverage ingredient powder spends between 10 and 30 minutes in step C.

Embodiments with such residence time in the drying zone have the additional advantage of lower fines and less breakage during further processing.

In some embodiments the beverage ingredient powder spends between 5 and 15 minutes in step D.

In some embodiments, the beverage ingredient powder has a total residence time of between 20 and 60 minutes in the continuous agglomerator, preferably between 30 and 50 minutes, most preferably between 35 and 50 minutes.

Embodiments with such total residence time have the optimal properties of the first aspect of the invention.

According to a third aspect of the invention, there is provided a method of making an agglomerated beverage ingredient powder of the first aspect of the invention, comprising step A, B, C and D of the second aspect of the invention, wherein, the gas used to fluidise the bed of beverage ingredient powder is heated in steps A, B and/or C to between 50 to 70° C. and the gas used to fluidise the bed of beverage ingredient powder is delivered at a flow rate of between 400 to 700 $Nm^3/h$.

According to a fourth aspect of the invention, there is provided a method of making an agglomerated beverage ingredient powder of the first aspect of the invention, comprising step A, B, C and D of the second aspect of the invention, wherein, the gas used to fluidise the bed of beverage ingredient powder is heated in steps A, B and/or C to between 50 to 70° C.; the gas used to fluidise the bed of beverage ingredient powder is delivered at a flow rate of between 400 to 700 $Nm^3/h$ and the gas used to fluidise the bed of beverage ingredient powder is cooled in step D to between 5 to 25° C.

According to a fifth aspect of the invention, there is provided a method of making an agglomerated beverage ingredient powder of the first aspect of the invention, comprising step A, B, C and D of the second aspect of the invention, wherein, the gas used to fluidise the bed of beverage ingredient powder is heated in steps A, B and/or C to between 50 to 70° C.; the gas used to fluidise the bed of beverage ingredient powder is delivered at a flow rate of between 400 to 700 $Nm^3/h$; the gas used to fluidise the bed of beverage ingredient powder is cooled in step D to between 5 to 25° C. and the spray rate of the liquid water droplets is between 0.5 to 3.0 kg/h.

According to a sixth aspect of the invention, there is provided a method of making an agglomerated beverage ingredient powder of the first aspect of the invention, comprising step A, B, C and D of the second aspect of the invention, wherein, the gas used to fluidise the bed of beverage ingredient powder is heated in steps A, B and/or C to between 50 to 70° C.; the gas used to fluidise the bed of beverage ingredient powder is delivered at a flow rate of between 400 to 700 $Nm^3/h$; the gas used to fluidise the bed of beverage ingredient powder is cooled in step D to between 5 to 25° C.; the spray rate of the liquid water droplets is between 0.5 to 3.0 kg per hour and the pressure under which the spray of liquid droplets is formed is between 1 to 3 bar.

According to a seventh aspect of the invention, there is provided a beverage preparation machine insertable beverage ingredient container comprising the beverage ingredient powder of the first aspect of the invention.

The container is preferably a beverage preparation machine insertable container.

In some embodiments, the agglomerated beverage preparation machine insertable beverage ingredient container is selected from: a capsule, a disc, a pod, a pad, a semi-rigid pad, a filter bag, a pouch, a cartridge. In preferred embodiments, the beverage ingredient container has a volume of between 25 ml to 65 ml. In more preferred, embodiments, the beverage preparation machine insertable beverage ingredient container comprises a beverage preparation machine-readable portion.

Embodiments with such container volumes have the additional advantages of compatibility with beverage preparation machines.

In some embodiments, the beverage ingredient powder occupies at least 45%, 50%, 55%, 60%, 65%, 70%, 75% or 80% and/or no more than 95% or 90% of the total volume of the beverage ingredient container. In some preferred embodiments the beverage ingredient powder occupies between 45%-95%, or between 55%-95%, or between 65%-95%, or between 75%-95%, or between 45%-90%, or between 55%-90%, or between 65%-90% or between 75%-90% of the total volume of the beverage ingredient container.

The preferred ranges of the density and median particle size described above enable significant volume of filling, whilst also enabling optimal extraction, suspension and/or solubility, and reduced residue compared to the prior art for each fill volume.

According to an eighth aspect of the invention, there is provided a method of preparing a beverage comprising; a) providing a beverage ingredient container of the seventh aspect of the invention; b) transporting fluid through the container; and c) dissolving and/or suspending at least some of the beverage ingredient powder in the fluid such that fluid exiting the container comprises at least a portion of the beverage ingredient powder extracted, dissolved and/or suspended therein.

In some embodiments, the fluid transported in step b) is transported under a pressure of less than 10 bar; 9 bar; 8 bar; 7 bar; 6 bar or; preferably, less than 5 bar.

In some embodiments, the beverage ingredient container is first inserted into a beverage preparation machine In preferred embodiments, the beverage preparation machine reads information relating to the beverage ingredients from the beverage ingredient capsule. The type of data read by the beverage preparation machine relates to, but is not limited to, the date of manufacture of the beverage ingredient capsule, the size; shape and/or volume of the container, one or more ingredients contained within, the type and/or volume of beverage to prepare or combinations thereof. In more preferred embodiments, the fluid flow rate, delay, pressure and/or temperature of the fluid transported through the beverage ingredient container is determined by the information read by the beverage preparation machine. An example of a machine or system which interacts with a capsule in this way is a Tassimo T20 manufactured by Bosch as disclosed in GB2397510. GB2397510 relates to a cartridge and machine for the preparation of beverage wherein each cartridge carries a code comprising a plurality of data bits in the form of a barcode. The barcode is read by a beverage preparation machine upon insertion of the cartridge in the machine.

Embodiments where the beverage preparation machine can adjust the parameters of the fluid transported through the beverage ingredient container are particularly preferred, as they have the additional advantages associated with tailoring the fluid parameters to the nature of the beverage ingredient and/or beverage ingredient container to further enhance the amount of beverage ingredient transported into the prepared beverage. In such embodiments, the beverage preparation machine may modify a parameter of the fluid, such as: volume; flow rate; pressure and/or temperature based on the information read from the beverage ingredient capsule to further optimise the dissolution of the beverage ingredient powder.

In some embodiments, the amount of beverage ingredient left as residue in the beverage ingredient container, after the beverage has been prepared is less than 20%, 15%, 10%, 5% or 2.5% of the starting volume or weight of the ingredient.

Such low residues have the advantage of low waste of beverage ingredient powder and reduced need for addition of excess beverage ingredient powder such that sufficient powder is transported into the beverage. They also have the advantage of more desirable beverages with more in cup solids resulting in better mouthfeel and taste.

In some embodiments, the amount of beverage ingredient carried by the fluid into the prepared beverage is more than 80%, 85%, 90%, 95% or 97.5% of the beverage ingredient within the beverage ingredient container.

In some embodiments, the amount of fluid transported through the beverage ingredient container is between 50 ml to 350 ml, preferably between 100 ml to 300 ml most preferably between 150 ml to 300 ml.

The agglomerated beverage ingredient powder of the invention can be stored in containers of the seventh aspect of the invention for normal storage periods, for examples up to 52 weeks, without significant loss of product quality.

In particular, the invention is an improvement in fat containing soluble powders dispensed from a flexible or rigid cavity. This includes milk powder, dairy creamer powder, non-dairy creamer and cocoa based powders. Embodiment of fat containing soluble powders of the invention significantly less undissolved powder is left after preparation with water, compared to the prior art.

According to a ninth aspect of the invention, there is provided an agglomerated beverage ingredient powder with a median particle size (D50) of between 150 and 600 microns, a density of between 350 and 850 g/l, and a porosity of between 0.1 and 0.8 for use in a beverage preparation machine.

According to a tenth aspect of the invention, there is provided an agglomerated beverage ingredient powder with a median particle size (D50) of between 150 and 600 microns, a density of between 350 and 850 g/l, and a water activity of less than 0.4 for use in a beverage preparation machine.

According to an eleventh aspect of the invention, there is provided an agglomerated beverage ingredient powder with a median particle size (D50) of between 150 and 600 microns, a density of between 350 and 850 g/l, a porosity of between 0.1 and 0.8 and a water activity of less than 0.4 for use in a beverage preparation machine According to a twelfth aspect of the invention, there is provided an agglomerated beverage ingredient powder with a median particle size (D50) of between 150 and 600 microns and a fat content of between 5% wt and 70% wt for use in a beverage preparation machine According to a thirteenth aspect of the invention, there is provided an agglomerated beverage ingredient powder with a median particle size (D50) of between 150 and 600 microns, a fat content of between 5% wt and 70% wt and a water activity of less than 0.4 and preferably a porosity of between 0.1-0.8 for use in a beverage preparation machine All of the further parameter ranges and features as described in the ninth to thirteenth aspect of the invention may be as described in the preferred ranges, features and limits of the parameters described for the first aspect of the invention.

DETAILED DESCRIPTION OF THE INVENTION

Definitions

"Milk powder" refers to a composition that comprises at least milk from animal sources, such as, goats, cows, sheep, etc., and milk alternatives derived from plant sources, including those derived from nuts; seeds; drupes, grains, including, but not limited to, almond, cashew, soybean, coconut, hemp, rice, horchata, peanut. It may be derived from full fat, semi-skimmed, skimmed, heat treated, homogenised milk etc. In particular, it may be full fat milk powder, semi skimmed milk powder and/or skimmed milk powder.

"Chocolate powder" refers to any powder comprising cocoa. It may further comprise additional ingredients such as a milk powder, a fat; a sweetener, bulking agent, drying agent, anti-caking agent; etc. The fat may be cocoa butter, cocoa butter equivalent, cocoa butter substitute or any animal or plant derived fat. The sweetener may be selected from a carbohydrate-based sweetener or a non-carbohydrate based sweetener. The carbohydrate-based sweetener may be selected from: sugars such as fructose, glucose, maltose, sucrose, lactose, dextrose, high fructose corn syrup or sugar substitutes like e.g. polyols such as sorbitol, mannitol, xylitol or combinations thereof, maltodextrins, dried glucose syrups, malt extracts, starches, trehalose, raftiline, raftilose, galactose, maltose, oligosaccharides, honey powders, and mixtures of same. The non-carbohydrate based sweetener may be an artificial sweetenerlike e.g. Splenda®, Acesulfame K®, aspartame or Stevia®, and mixtures of the same.

"Non-dairy creamer" refers to a product that replicates the mouthfeel and/or flavour of dairy milk and comprises a fat or oil, a protein and a sweetener. Any appropriate food grade fat/oil, protein and sweetener may be use in the composition as disclosed I W) 98/07329 and WO 2010/040727 for instance.

"Dairy creamer" refers to products known commercially as 'Dairy creamer'. They are typically compositions that comprise at least a vegetable fat and an amount of sodium caseinate.

"Agglomeration" includes the combining of small powder particles to produce larger particles (agglomerates, aggregates or clusters) by, for example, adhesive binding or compacting of the particles.

Agglomeration may be achieved by press agglomeration, compacting, briquetting, pelletising, extrusion, mixing, continuous and batch fluid bed processing.

In order that the invention may be more clearly understood embodiments will now be described, by way of example only, with reference to the accompanying drawings, of which.

EXAMPLES

Example 1: An Apparatus Used in a Method of Manufacturing an Agglomerated Powder of the Invention Referring to FIG. 1, a continuous agglomeration system (2) used in methods to manufacture powders of the invention is shown. The continuous agglomeration system (2) comprises an inlet (6) and an outlet (8) for a beverage ingredient powder (4). The system (2) further comprises a wetting zone (10) with spray nozzles (12); a drying zone (14) without spray nozzles and a cooling zone (15) without spray nozzles, a plurality of air inlets (16), air distributor (18) and air exhaust (20).

Figure 1:
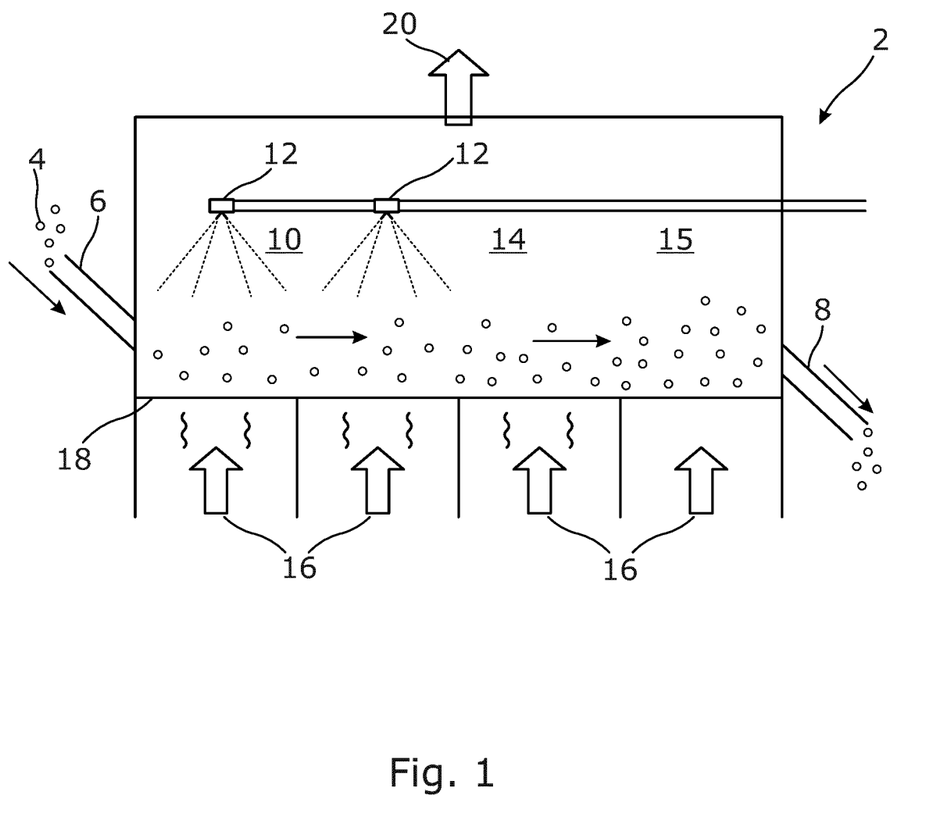
FIG. 1 is a schematic of a continuous agglomeration system used in a method of the invention to produce agglomerated powders of the invention.

The beverage ingredient powder (4) is passed through the continuous agglomeration system (2) from inlet (6) to outlet (8); leaving the system (2) as agglomerated beverage ingredient powder.

The inlet (6) is configured to deliver pre-beverage ingredient powder (4) to the start of the agglomeration process. The spray nozzles (12) are configured to create the wetting zone (10) where the surface of the beverage ingredient powder (4) is wetted and particles of beverage ingredient powder can agglomerate. The air inlet (16) and air distributor (18) are configured to deliver air to the bed of beverage ingredient powder and provide agitation (to avoid excessive agglomeration) and drying (to complete the agglomeration process). The outlet (8) is configured to deliver post-agglomeration beverage ingredient powder for further processing or packing In use, a beverage ingredient powder (4) may be a single ingredient or a pre-blended concoction of suitable different ingredients. The beverage ingredient powder (4) is passed through the inlet (6) to form a bed of beverage ingredient powder. The bed of beverage ingredient powder is fluidised by gas directed via inlets (16) through a distributor (18) underneath the bed of powder. The gas may be subject to heating or cooling before arriving at the fluidised bed of beverage ingredient powder.

Firstly, the fluidised bed of beverage ingredient powder enters a wetting zone (10) within the continuous agglomeration process. The wetting zone (10) is created by a number of spray nozzles (12) that dispense droplets of fluid in the form of water, that may comprise further ingredients such as an emulsifier or sweetening agent, onto the fluidised bed of beverage ingredient powder. The water droplets are defined by the pressure at which the fluid arrives at the spray nozzles (12), the flow rate of the fluid and the geometry of the spray nozzles (12) themselves, all of which are controllable by the operator. The beverage ingredient powder has a residence time within the wetting zone (10) that can be defined by the operator to modify the properties of the beverage ingredient powder (4) after processing.

After time in the wetting zone (10) the fluidised bed of beverage ingredient powder moves to the drying zone (14) of the continuous agglomerator, away from the addition of water droplets. In the drying zone (14) the gas used to fluidise the bed of beverage ingredient powder is typically heated to a temperature higher than that of the gas that was used in the wetting zone (10) in order to facilitate the efficient drying of the beverage ingredient powder. The residence time of the beverage ingredient powder in the drying zone (14) is also under the control of the operator and will affect the final properties of the beverage ingredient powder (4).

After time in the drying zone (14), the fluidised bed of beverage ingredient powder moves to the cooling zone (15) of the continuous agglomerator. In the cooling zone (15) the gas used to fluidise the bed of beverage ingredient powder is typically cooled (or heated less) to a lower temperature than the gas that was used in the wetting zone (10) or the drying zone (14) in order to facilitate the cooling and hardening of the beverage ingredient powder (4). The residence time of the fluidised bed of beverage ingredient powder within the cooling zone (15) is controllable by the operator and has an effect on the final properties of the beverage ingredient powder (4).

After time in the cooling zone the beverage ingredient powder (4) exits the continuous agglomerator via outlet (8) and on to further processing such as blending with other ingredients or packing

Example 2—Preparation of an Embodiment of a Chocolate Beverage Powder of the Invention An embodiment of a beverage ingredient powder of the first aspect of the invention, in the form of a chocolate powder, was prepared as set out below:

Using an embodiment of an agglomeration process of the second aspect of the invention, with reference to FIG. 1, a control chocolate powder, comprising 42% sucrose, 22% skimmed milk powder, 10% whole milk powder, 9% cocoa powder, 3% coconut oil, 6% glucose syrup solids, 5% sweet whey powder and some additional minor ingredients such as flavourings, was passed through the continuous agglomeration system (2) from inlet (6) to outlet (8) using the process parameters set out in Table 1; and leaving the system (2) as agglomerated chocolate powder of the invention.

TABLE 1

Agglomeration process parameters for production of chocolate powder of Example 2

| Process Parameter | | Value |
|---|---|---|
| Product throughput (kg $h^{-1}$) | | 25 |
| Mean residence time in continuous agglomerator (min) | | 42 |
| Spraying liquid, Spray rate (kg $h^{-1}$) | Water | 1.2 |
| Atomization pressure of spraying liquid (bar) | | 1.8-2.2 |
| Ratio Water/Beverage ingredient powder (%) | | 4.8 |
| Air flow volume ($Nm^3$ $h^{-1}$) | | 550 |
| Inlet air temperature (° C.) | Wetting zone | 58-60 |
| Inlet air temperature (° C.) | Drying zone | 70 |
| Inlet air temperature (° C.) | Cooling zone | 15 |
| Product temperature (° C.) | Wetting zone | 42.3-45.0 |
| Product temperature (° C.) | Drying zone | 42.7-44.6 |
| Product temperature (° C.) | Cooling zone | 38.2-40.5 |
| Mean residence time (minutes) | Wetting zone | 10.5 |
| Mean residence time (minutes) | Drying zone | 21 |
| Mean residence time (minutes) | Cooling zone | 10.5 |

The agglomerated chocolate powder produced in this way had physical properties as set out in Table 2, which also indicates the equivalent properties of the control chocolate powder, before agglomeration:

TABLE 2

Physical properties of the chocolate powder of Example 2

| Powder | Bulk density (g/l) | Tapped density (g/l) | Hausner's Ratio | D50 (μm) | Fines Q90 (%) | Porosity | Water activity |
|---|---|---|---|---|---|---|---|
| Chocolate (Control) | 651.4 | 761 | 1.15 | 169.7 | 27.3 | 0.52 | 0.32 |
| Chocolate (According to the invention) | 564 | 636.9 | 1.13 | 192.2 | 14.15 | 0.60 | 0.25 |

Bulk Density and Tapped Density

These were measured by calculation from mass and volume. Bulk density, sometimes known as free flow density, was measured before any tapping, or vibration to settle the powder. Tapped density was measured after a tapping routine.

Steps for measurement of both densities were as follows:

Bulk Density
1—Powder was placed into a plastic bag and mixed gently by hand 15 times using a circular motion to ensure it was in a free-flowing state.
2—An amount of the powder sufficient to fill a 250 ml beaker, was poured in a steady, free-flowing motion into a graduated cylinder and the volume occupied by the powder read off.
3—The ratio of mass and volume of the powder was used to calculate Bulk/Free flow density.

Tapped Density
1—After measuring the Bulk Density as described above, the powder of Example 2 was placed in a tap volumeter, such as that manufactured by Agilent Technologies.
2—The tap volumeter was set to a cycle of 150 strokes/taps, after which the volume occupied by the powder was read from the graduated cylinder.
3—After the tapping cycle the ratio of mass and volume was used to calculate Tapped density.

Porosity

Porosity was measured by using the equation:

Porosity=(1−Bulk density/Particle density)

The Particle density was measured using an Accupyc 1300 Helium Pycnometer (manufactured by Micromeritics Instrument Corporation, USA) by the following process:
1—3-4 g of powder was weighed in a cylinder
2—The cylinder was inserted into the pycnometer and the particle density was measured.

Hausner's Ratio

Hausner's ratio was calculated as the tapped density of the powder divided by the bulk density of the powder.

Fines/Particle Size

These were measured by using a laser diffraction method on Helos Particle Size Distribution measurement equipment (Helos/KF manufactured by Sympatec GmbH) in the following way:

1—A sample of powder was placed into a plastic bag and mixed gently by hand 15 times using a circular motion to ensure it was in a free-flowing state. Then the chocolate powder was placed in a Turbula mixer and allowed to equilibrate to ambient temperature (~22° C.)

2—The Vibri funnel was filled with ~35-50 g of the powder and the instrument set to analyse Median particle size (D50) and the amount of particles with largest dimension below 90 microns (Q90).

The settings in Table 3 and Table 4 were used to measure the various powders:

TABLE 3

Setting used to analyse particle size

| Sample type | Calculation mode | Lens | Trigger conditions | Dispersing conditions |
|---|---|---|---|---|
| Non-dairy creamer | LD or free (forced stability −1) | R5 | Reference: 15 s<br>Start: ch 25 ≥ 1.0%<br>Stop: ch 25 ≥ 1.0%<br>2 s time out | Vibri speed: 100%<br>Vibri funnel rotation: 90%<br>Vibri gap: 8 mm<br>Primary pressure 1.5 bar. |
| Chocolate powder | LD or free (forced stability −1) | R6 or R7 | Reference: 15 s<br>Start: ch 25 ≥ 0.3%<br>Stop: ch 25 ≥ 0.3%<br>2 s time out | Vibri speed: 100%<br>Vibri funnel rotation: 90%<br>Vibri gap: 1 mm<br>Primary pressure 1.0 bar. |
| Whole milk powder | LD or free (forced stability −1) | R5 | Reference: 15 s<br>Start: ch 25 ≥ 1.0%<br>Stop: ch 25 ≥ 1.0%<br>2 s time out | Vibri speed: 100%<br>Vibri funnel rotation: 90%<br>Vibri gap: 8 mm<br>Primary pressure 1.5 bar. |

TABLE 4

| Lens parameters | | |
|---|---|---|
| Lens code | Focal length (mm) | PSD range (μm) |
| R5 | 500 | 4.5-875 |
| R6 | 1000 | 9.0-1759 |
| R7 | 2000 | 18-3500 |

Water Activity

Water activity was measured using a standard dew point measurement on an Aqualab 3TE series, manufactured by Labcell Ltd, UK as described below:
1—The Aqualab instrument was calibrated using the water activity standards of 0.250 and 0.500 prior to each measurement to ensure accurate calibration of the instrument before each measurement.

2—A sample of powder as mixed gently by hand to ensure it was in a free-flowing state and a small amount of sample added to a sample cup such that the powder covers the bottom of the cup in a thin layer.

3—The sample cup was placed to the drawer of the Aqualab 3TE instrument and allowed to equilibrate to ambient temperature.

4—Once the equilibration was reached, a water activity reading was given by the instrument.

The chocolate powder of Example 2, according to the invention, produced by the continuous agglomeration process, showed a reduction in bulk density and improved flowability with a reduction in the Hausner's ratio compared to the control chocolate powder. Further, the D50 of the continuously agglomerated chocolate powder was higher than that of control chocolate powder and the Q90 (amount of fines) significantly reduced to about 14%, from 27% in the control chocolate powder, resulting in an increase in porosity of around 0.1.

By these parameters the chocolate powder according to the invention, made by continuous agglomeration, showed better flowability, lower level of fines, higher median particle size and increased porosity over standard chocolate powder.

Example 3: Use of the Chocolate Powder According to the Invention, of Example 2, in Preparation of a Beverage 30 g of the chocolate powder according to the invention, made by continuous agglomeration, was packed into a commercial Tassimo Big T-disc at a volume of 53.2 ml (88% fill volume) and chocolate powder residues measured and compared to an identical Tassimo Big T-disc packed with 30 g of control chocolate powder at a volume of 46 ml (76% fill volume) in a range of Tassimo beverage preparation machines.

The range of Tassimo machines are all capable of reading barcodes located on the T-discs (or any other capsule, pod, container, etc.) in order to adjust the brewing parameters of the machine such as water flow rate, temperature, etc., in accordance with information read from the barcode.

Figure 3:
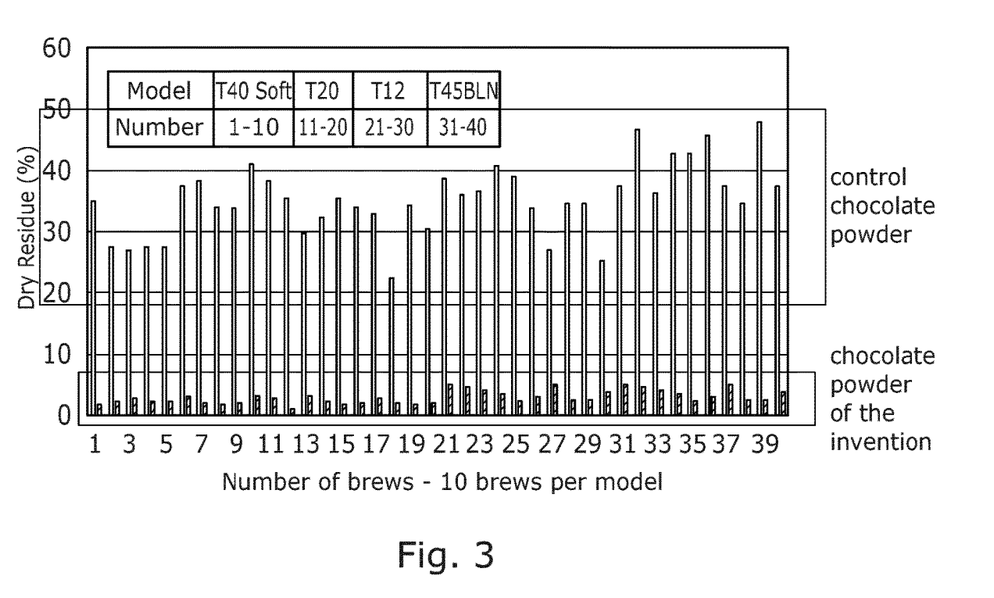
FIG. 3 is a comparison of residues remaining in beverage ingredient containers after beverage preparation in a range of different beverage preparation machines

The range of Tassimo machines provided water heated to between 85 and 95° C. and drink weight of 160 ml to 235 ml Chocolate powder residues were significantly reduced across the range of all machines tested, as shown in FIG. 3. For each pair of results the right-hand, shorter line is the control. Residue was calculated as the percentage of chocolate powder remaining in the disc after the brew cycle had been completed.

Example 4: $2^{nd}$ Embodiment of a Chocolate Powder of the Invention

A $2^{nd}$ control chocolate powder characterized by 36% fines and a bulk density of 690 g/l had a poor residue of 38% after brewing.

The $2^{nd}$ control chocolate powder was then processed by the continuous agglomeration process of Example 1 to become a $2^{nd}$ agglomerated chocolate powder according to the invention.

The $2^{nd}$ agglomerated chocolate powder according to the invention showed properties of significantly lower level fines (11%) and lower bulk density (550 g/l) than that of the $2^{nd}$ control.

The $2^{nd}$ agglomerated chocolate powder of the invention and the $2^{nd}$ control chocolate powder were then added to respective Tassimo Big T-discs and both were prepared in a Tassimo Chassis 6 machine.

Figure 2:
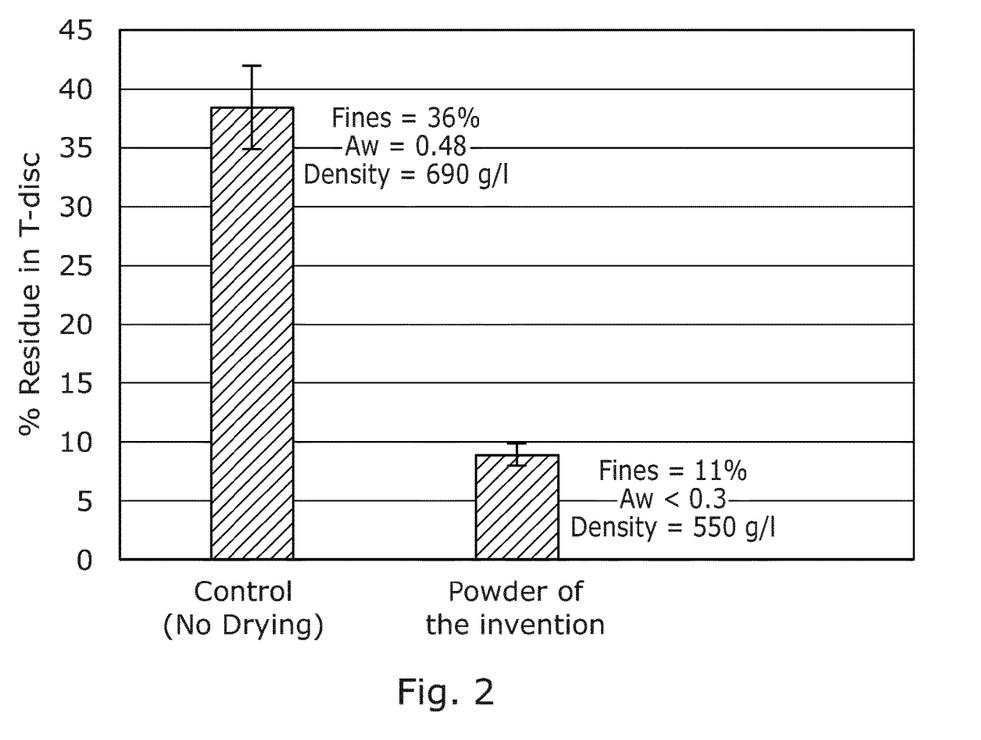
FIG. 2 is a comparison of an agglomerated chocolate powder of the invention to a control chocolate powder of the prior art.

The resultant, used, Big T-discs showed that there was a significant reduction in chocolate residue in the disc that contained the $2^{nd}$ chocolate powder according to the invention vs the disc that had contained the $2^{nd}$ control chocolate powder after brewing: 37% residue with the $2^{nd}$ control and 8% residue with the $2^{nd}$ chocolate powder according to the invention; as shown in FIG. 2.

Further the $2^{nd}$ agglomerated chocolate powder according to the invention, after continuous agglomeration, had lower water activity than the $2^{nd}$ control chocolate powder, before processing. The second chocolate powder according to the invention had a water activity of 0.37 compared to the $2^{nd}$ control chocolate powder water activity of 0.48.

The low water activity (<0.37) of the agglomerated chocolate powder maintains low residue in the disc, after brewing, over time compared to the $2^{nd}$ control.

Example 5: Optimising Powders of the Invention for Improved Shelf-Life

A 3rd agglomerated chocolate powder of the invention with a water activity of 0.59, median particle size (D50) of 338 microns, fines level (Q90) of 3.7% and density of 420 g/l was brewed in a Tassimo Chassis 6 brewer yielding residue of 4%.

The $3^{rd}$ agglomerated chocolate powder of the invention was further processed in an agglomerator of Example 1 to produce an Improved agglomerated chocolate powder of the invention, with improved shelf-life.

The Improved agglomerated chocolate powder of the invention, with improved shelf life, had a water activity of 0.33, median particle size (D50) of 295 microns, fines level (Q90) of 5.3% and a density of 486 g/l.

Both powders were placed in a shelf life cabinet of 23° C. at 55% Relatively Humidity (RH) and each month, water activity and residue after preparation in a standard Chassis 6 machine, were measured.

Figure 4A:
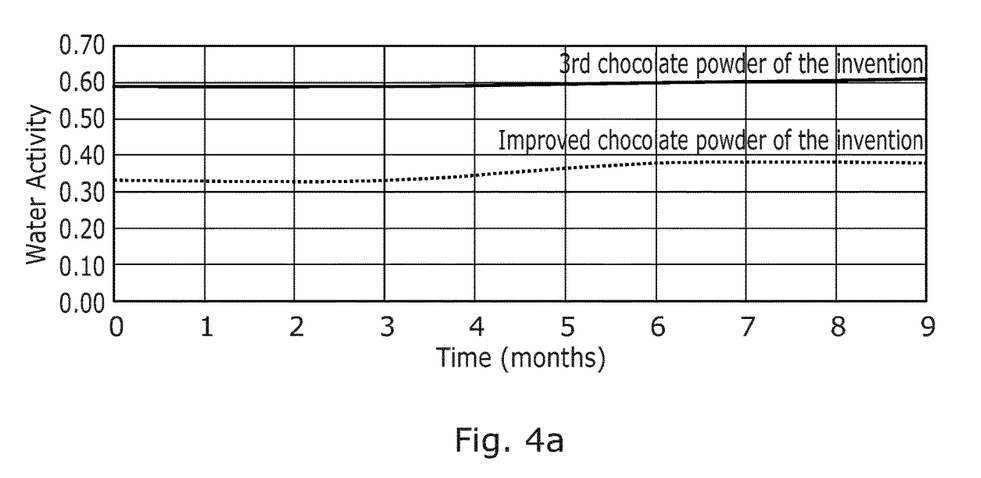
FIG. 4a is a comparison of the water activities of a $3^{rd}$ chocolate powder of the invention and an Improved chocolate powder of the invention over shelf life

As shown in FIG. 4a: At 9 months shelf life the $3^{rd}$ agglomerated chocolate powder of the invention had a water activity of 0.61; whereas the Improved agglomerated chocolate powder of the invention with improved shelf life had a water activity level of 0.378.

Figure 4B:
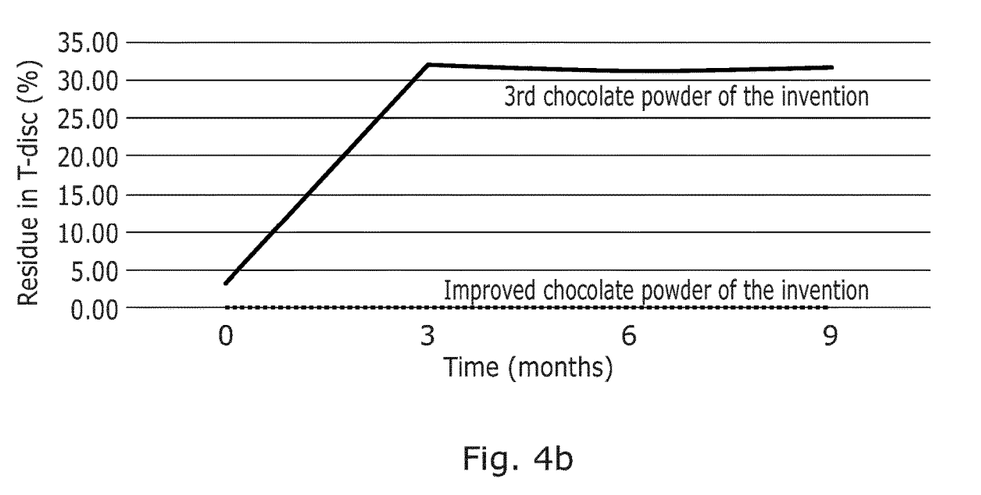
FIG. 4b is a comparison of $3^{rd}$ chocolate powder of the invention and an Improved chocolate powder of the invention over shelf life

As shown in FIG. 4b: At 9 months shelf life the $3^{rd}$ agglomerated chocolate powder of the invention yielded a residue of 31.7%; whereas the Improved chocolate powder of the invention with improved shelf life yielded a residue of 0.2%. FIGS. 4a and 4b show the performance of both chocolate powders over a 9-month shelf life and that the Improved chocolate powder of the invention with improved shelf life was further optimised for performance over the shelf life of the product.

Example 6: Dairy Creamer

A 6.2 g of a Control dairy creamer comprising 64% skimmed milk powder, 27.5% sugar and 8.25% Cream powder (total fat of 7.9%) was packed into a standard Senseo filter pod. When used in a standard Senseo Original beverage preparation machine it had a solubility of 75% (25% residue left in the pod after use).

The Control dairy creamer was then agglomerated in a batch process to produce an agglomerated Dairy creamer of the invention. The batch agglomeration process differed from the continuous agglomeration process of Example 1 in the following ways:
- The wetting, drying and cooling steps were all performed in the same zone of the batch agglomerator
- The batch process started with filling the batch agglomerator with beverage ingredient powder and finished with emptying the batch agglomerator of the beverage ingredient powder The batch agglomerator was a Strea-1 agglomerator, manufactured by GEA. During processing the beverage ingredient powder temperature was maintained below 45° C. and the total residence of the powder in the agglomerator was kept below 30 mins.

The physical properties of the Control dairy creamer were improved in the Dairy creamer according to the invention, after continuous agglomeration, as follows:
- The Control dairy creamer had D50 of 198 microns, whereas the Diary creamer according to the invention, after continuous agglomeration had D50 of 293 microns
- The Control dairy creamer had a fines content (Q90) of 23% whereas the Dairy creamer according to the invention, after continuous agglomeration had Q90 of 5%.
- The Control dairy creamer had a bulk density of 508 g/l, whereas the Dairy creamer according to the invention, after continuous agglomeration had a bulk density of 465 g/l When used in the standard Senseo Original beverage preparation machine, the solubility of the Dairy creamer according to the invention, after agglomeration, went up to 90% (10% residue left in the pod after use).

Example 7—High Shear Agglomerated Powder 11.5 g of a control dairy powder comprising 75% whole milk powder and 25% icing sugar (19.5% wt total fat, 440 g/l bulk density, median particle size (D50) of less than 100 microns and fines level (Q90) of 26.8%) was packed into standard Tassimo disc to create a control dairy powder T-disc.

An agglomerated dairy powder of the invention was created from the control dairy powder by adding the Second control dairy powder into a mixer and set to mix by an impeller mounted on a vertical axis at between 180 and 125 RPM to create high shear throughout processing. The powder was then wetted with a liquid binder (water) sprayed through a nozzle at a rate of 30 g/min for 10 minutes. The powder was then subjected to fluid bed drying with heated air for 35 minutes such that the powder temperature was maintained below 50° C. The resultant powder had a bulk density of 800 g/l.

The powder was then milled and passed through a 0.8 mm sieve to yield an agglomerated diary powder of the invention with bulk density of 700 g/l, water activity of below 0.37, D50 particle size of 710 microns and Q90 of <5%. Without wishing to be bound by theory, the inventors believe that the 0.8 mm sieve is important to the working of the invention as particles over 1 mm contribute to lower solubility of the powder', particularly when used in conjunction with beverage preparation machines that work at relatively low pressure (i.e. pressures below about 5-10 bar).

18 g of the agglomerated dairy powder of the invention was packed into a standard Tassimo disc to create a Second dairy powder T-disc of the invention.

Both T-disc were brewed in a Tassimo T20 machine and the residue left in the discs after preparation was measured.

The control dairy T-disc yielded a residue in the disc after brew of 12% of the 11.5 g of control powder loaded into the disc before brewing.

The agglomerated dairy powder T-disc of the invention yielded a residue in the disc after brew of 4% of the 18 g of powder of the invention loaded into the disc before brewing.

The above embodiments are described by way of example only. Many variations are possible without departing from the scope of the invention as defined in the appended claims.

The invention claimed is:

1. A method of making a beverage ingredient powder, the beverage ingredient powder being an agglomerated beverage ingredient powder comprising a median particle size (D50) of between 150 and 1000 microns and a density of between 250 and 950 g/l, wherein the percentage of particles having a largest dimension of less than 90 microns is between 2%-20%, and wherein the beverage ingredient powder comprises a porosity of between 0.1 and 0.8, the method comprising steps of:
a) Fluidising a bed of beverage ingredient powder with the introduction of a gas;
b) Spraying liquid droplets onto the fluidised bed of beverage ingredient powder;
c) Drying the fluidised bed of beverage ingredient powder; and
d) Cooling the fluidised bed of beverage ingredient powder,
wherein the ratio of sprayed liquid droplet volume to beverage ingredient powder volume is between 1:99 to 1:9.

2. The method of claim 1 wherein the gas is heated to between 50 to 70° C. during at least a portion of steps b) and/or c) and cooled to between 5 to 25° C. during at least a portion of step d).

3. The method of claim 1 wherein the gas is delivered at a flow rate of between 400 to 700 Nm$^3$/h.

4. The method of claim 1 wherein the liquid droplets are sprayed at between 1 to 3 bar and at between 0.5 to 3 kg/h.

5. The method of claim 1 wherein the total residence time of the beverage ingredient powder within steps a)-d) is between 20 to 60 minutes.

6. A method of making an agglomerated beverage ingredient powder comprising a median particle size (D50) of between 150 and 1000 microns and a density of between 250 and 950 g/l, the method comprising steps of:
a) Fluidising a bed of beverage ingredient powder with the introduction of a gas;
b) Spraying liquid droplets onto the fluidised bed of beverage ingredient powder;
c) Drying the fluidised bed of beverage ingredient powder; and
d) Cooling the fluidised bed of beverage ingredient powder;
wherein the gas is heated to between 50 to 70° C. during at least a portion of steps b) and/or c) and cooled to between 5 to 25° C. during at least a portion of step d).

7. A method of making an agglomerated beverage ingredient powder comprising a median particle size (D50) of between 150 and 1000 microns and a density of between 250 and 950 g/l, the method comprising steps of:
a) Fluidising a bed of beverage ingredient powder with the introduction of a gas;
b) Spraying liquid droplets onto the fluidised bed of beverage ingredient powder;
c) Drying the fluidised bed of beverage ingredient powder; and d) Cooling the fluidised bed of beverage ingredient powder;

wherein the gas is delivered at a flow rate of between 400 to 700 $Nm^3/h$.

8. A method of making an agglomerated beverage ingredient powder comprising a median particle size (D50) of between 150 and 1000 microns and a density of between 250 and 950 g/l, the method comprising steps of:
   a) Fluidising a bed of beverage ingredient powder with the introduction of a gas;
   b) Spraying liquid droplets onto the fluidised bed of beverage ingredient powder;
   c) Drying the fluidised bed of beverage ingredient powder; and
   d) Cooling the fluidised bed of beverage ingredient powder;

wherein the liquid droplets are sprayed at between 1 to 3 bar and at between 0.5 to 3 kg/h.

9. A method of making an agglomerated beverage ingredient powder comprising a median particle size (D50) of between 150 and 1000 microns and a density of between 250 and 950 g/l, the method comprising steps of:
   a) Fluidising a bed of beverage ingredient powder with the introduction of a gas;
   b) Spraying liquid droplets onto the fluidised bed of beverage ingredient powder;
   c) Drying the fluidised bed of beverage ingredient powder; and
   d) Cooling the fluidised bed of beverage ingredient powder;

wherein the ratio of sprayed liquid droplet volume to beverage ingredient powder volume is between 1:99 to 1:9.

10. A method of making an agglomerated beverage ingredient powder comprising a median particle size (D50) of between 150 and 1000 microns and a density of between 250 and 950 g/l, the method comprising steps of:
    a) Fluidising a bed of beverage ingredient powder with the introduction of a gas;
    b) Spraying liquid droplets onto the fluidised bed of beverage ingredient powder;
    c) Drying the fluidised bed of beverage ingredient powder; and
    d) Cooling the fluidised bed of beverage ingredient powder;

wherein the total residence time of the beverage ingredient powder within steps a)-d) is between 20 to 60 minutes.

* * * * *